(12) United States Patent
Bright et al.

(10) Patent No.: US 7,111,778 B2
(45) Date of Patent: Sep. 26, 2006

(54) SYSTEMS AND METHODS FOR PROVISIONING AND TRACKING A COMMUNICATION PLATFORM WITH A RADIO-FREQUENCY TAG

(75) Inventors: Norman T. Bright, Portland, OR (US); Nelson L. Yaple, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 10/880,978

(22) Filed: Jun. 29, 2004

(65) Prior Publication Data

US 2005/0284939 A1    Dec. 29, 2005

(51) Int. Cl.
*G06K 5/00* (2006.01)

(52) U.S. Cl. .................. 235/380; 235/385

(58) Field of Classification Search ........... 235/385, 235/380; 340/825.51, 10.1
See application file for complete search history.

(56) References Cited

U.S. PATENT DOCUMENTS

| 6,177,860 B1 * | 1/2001 | Cromer et al. ........... 340/10.1 |
| 6,778,096 B1 * | 8/2004 | Ward et al. ........... 340/825.51 |
| 6,982,672 B1 * | 1/2006 | Lin et al. ............ 343/700 MS |
| 2005/0011948 A1 * | 1/2005 | Pate ........................ 235/385 |

* cited by examiner

Primary Examiner—Ahshik Kim
Assistant Examiner—Kristy A. Haupt
(74) Attorney, Agent, or Firm—Schwegman, Lundberg, Woessner & Kluth, P.A.

(57) ABSTRACT

A communication platform performs a self-provisioning process using provisioning information stored in a radio-frequency (RF) tag. The platform may be tracked using some of the information stored in the RF tag.

25 Claims, 5 Drawing Sheets

SYSTEMS AND METHODS FOR PROVISIONING AND TRACKING A COMMUNICATION PLATFORM WITH A RADIO-FREQUENCY TAG

TECHNICAL FIELD

Embodiments of the present invention pertain to electronic communications and in some embodiments to radio-frequency tags.

BACKGROUND

Communication platforms are often specifically configured to operate within certain parameters or within an organization's network. Conventionally, when an information technology (IT) department within the organization receives a communication platform, such as a computer or some device from a vendor, the platform is physically pulled out of the box, powered on, and configured manually through a peripheral device, such as a keyboard. In some cases, the platform or device may be configured by plugging it into a network and passing down configuration information into the platform. This process is sometimes referred to as "provisioning". The configuration information may include security certificates, network settings, input/output settings and device options. After the configuration is complete, the platform may then be passed on to the end user. This provisioning process can take quite a bit of time and involves unpacking and repacking the platform. Thus, there are general needs for self-provisioning communication platforms and methods of provisioning that are simpler, less costly, and less time-consuming.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
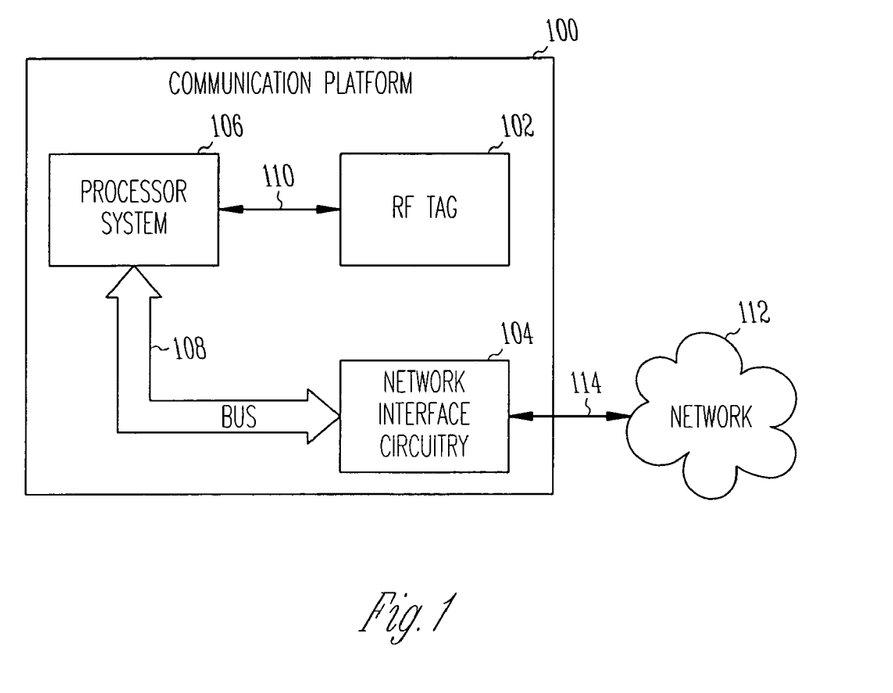
FIG. 1 is a block diagram of a communication platform in accordance with some embodiments of the present invention.

FIG. 1 is a block diagram of a communication platform in accordance with some embodiments of the present invention. Communication platform 100 includes processor system 106 and network interface circuitry 104 for communicating with network 112. In some embodiments, communication platform 100 may be almost any type of wireline or wireless communication device including, for example, a computer system, a network or Internet communication device, as well as other devices suitable for communication within local area networks including wireless local area networks, although the scope of the invention is not limited in this respect.

In accordance with some embodiments of the present invention, communication platform 100 may include radio-frequency (RF) tag 102 with platform parameters stored therein. In some embodiments, RF tag 102 may be coupled with processor system 106 over bus 110. In other embodiments, RF tag 102 may be part of network interface circuitry 104. In accordance with some embodiments of the present invention, RF tag 102 may be used for provisioning communication platform 100. In accordance with some embodiments of the present invention, RF tag 102 may be used for tracking communication platform 100.

In accordance with some embodiments, RF tag 102 may be interrogated to determine platform information stored therein, and provisioning parameters may be written to a non-volatile storage element of RF tag 102. In some embodiments, the interrogating and writing may be performed upon receipt of platform 100 from a manufacturer or distributor. In some embodiments, the interrogating and writing may be performed while platform 100 is still in a shipping box or other container, although the scope of the invention is not limited in this respect. In these embodiments, it may not be necessary to remove platform 100 from the box and power up platform 100 to write the provisioning parameters to platform 100.

In some embodiments, a self-provisioning process may be performed by platform 100 using the provisioning parameters stored in RF tag 102 when platform 100 is turned on and at least initially coupled with network 112. In some embodiments, the provisioning process may include processor system 106 querying RF tag 102 over internal bus 110 to determine the provisioning parameters. In other embodiments, the provisioning process may include processor system 106 querying network interface circuitry 104 over internal bus 108 to determine the provisioning parameters stored in an RF tag that is part of network interface circuitry 104.

The provisioning process may also include querying network 112 to locate a server identified by the provisioning parameters, and providing at least some of the provisioning parameters and some of the platform information to the server. The provisioning process may also include downloading an image from the server for installation on platform 100. In some embodiments, the image may be preselected for platform 100 by the server based on the provided provisioning parameters. In some embodiments, the image may include an image of a local drive of platform 100. In some embodiments, the image may be a predetermined system configuration for operation of platform 100 within a certain network, such as network 112. In some embodiments, security certificates, such as a globally-unique identifier (GUID), network settings, input/output system settings and device options may be downloaded during the provisioning. In some embodiments, the provisioning parameters may include a user identifier or name, a server identifier, a server location, software versions, etc.

In some embodiments, the provisioning parameters may initially be generated based on at least some of the platform information determined from RF tag 102. In some embodiments, the platform information may include, for example, an amount of memory, operating system type, model number, serial number, processor type, basic input/output system (BIOS) information, installed peripherals information, operating system preload information, and/or a media-access controller (MAC) address. In some embodiments, the platform information may be stored in RF tag 102 by a manufacturer, distributor or supplier of platform 100. In some embodiments, information about the platform, such as detailed input/output device information and peripheral information (e.g., serial number, embedded BIOS revision) may be used for generating the provisioning parameters and/or for storing in a database for use in asset tracking, although the scope of the invention is not limited in these respects.

In some embodiments, during the provisioning process at least some of the provisioning parameters and at least some of the platform information may be provided to a server identified by the provisioning parameters. The platform information that may be supplied to the server during the provisioning process may be from RF tag 102, although the scope of the invention is not limited in this respect.

In some embodiments, RF tag 102 may be coupled to processor system 106 with wireline bus 110. In these embodiments, platform 100 may read the provisioning parameters from RF tag 102 over bus 110 prior to providing the provisioning parameters to the server during the provisioning process. In some embodiments, RF tag 102 may comprise a non-volatile storage element coupled to internal wireline bus 110. In these embodiments, wireline bus 110 may be a three-wire bus, such as an inter-integrated circuit (12C) bus, a low-pin count (LPC) bus, a universal serial bus (USB), an inter-processor communication (IPC) bus or a system management (SM) bus. In these embodiments, the non-volatile storage element may store at least some of the platform information, and the provisioning parameters may be written to the non-volatile storage element prior to provisioning.

In some embodiments in which an RF tag is part of network interface circuitry 104, network interface circuitry 104 may be coupled to processor system 106 with wireline bus 108. In these embodiments, non-volatile storage element of the RF tag may be coupled to media access controller (MAC) circuitry of network interface circuitry 104. These embodiments are described in more detail below. In some of these embodiments, wireline bus 108 may be a peripheral-component-interconnect (PCI) bus, although the scope of the invention is not limited in this respect. In some embodiments, platform information stored in an RF tag that is part of network interface circuitry 104 may comprise a media access controller (MAC) address, and the provisioning process may include providing the provisioning parameters and the MAC address to a server identified by the provisioning parameters.

In some asset-tracking embodiments, an asset tracking number may be written to RF tag 102 for storage in the tag's non-volatile storage element. Locations of platform 100 may be tracked by interrogating RF tag 102 to determine the asset tracking number. In some embodiments, the asset tracking number, with at least some of the platform information, may be stored in a remote (e.g., centralized) asset-tracking database (i.e., not on platform 100). Platform 100 may be tracked when it is removed from a location or returned to the location by interrogating RF tag 102 upon either entry or exit from the location. The asset-tracking database may be updated with a current location of platform 100 based on the tracking.

In some embodiments, the current location may be updated when platform 100 is coupled remotely to a network. In these embodiments, the actual geographic location of platform 100 may not be known, however, but it is known that platform 100 is located remotely, although the scope of the invention is not limited in this respect.

In some embodiments, after writing the provisioning parameters and/or the asset tracking number to the non-volatile storage element of RF tag 102, subsequent writing to the non-volatile storage element may be inhibited. In some embodiments, read-only bits of the non-volatile storage element may be set to inhibit subsequent writing, although the scope of the invention is not limited in this respect. Other techniques for inhibiting writing to a memory element may also be suitable.

In accordance with some embodiments, RF tag 102 may be used to transport data securely through a shipping box, eliminating the need to take a communication platform, such as platform 100, out of the box. In some embodiments, an original equipment manufacture may program or preprogram RF tag 102 with basic system and manufacturing information. In some embodiments, RF tag 102 may be an add-on card, which may be separately purchased. The information exchange may be accomplished physically through a shipping box, and the box may not need to be opened, and platform 100 may not need to be powered on. RF tag 102 may allow an exchange of information without powering on platform 100, because RF tag 102 may have its own inherent energy. This is described in more detail below.

Additionally, platform 100 may now be easier to track, because its information may be easily correlated to an individual user within the organization who may be the end-user. Updating asset records may be easily accomplished by having a person walk around with, for example, a handheld RF tag interrogator and read the platform information from the platforms being tracked. Because there is no need to power-on platform 100, this task may consume significantly less time than it currently takes to track/update asset information. Additionally, there may be less need for highly skilled labor to perform asset-tracking tasks, as it may not require knowledge of how to retrieve information from a variety of platform types.

In some embodiments, when communication platform 100 is a wireless communication device, link 114 may be a wireless communication link, and network 112 may be a wireless network. In these embodiments, network interface circuitry 104 may include a wireless transceiver and may be coupled with an antenna (not shown) for communicating over link 114, although the scope of the invention is not limited in this respect.

Figure 2:
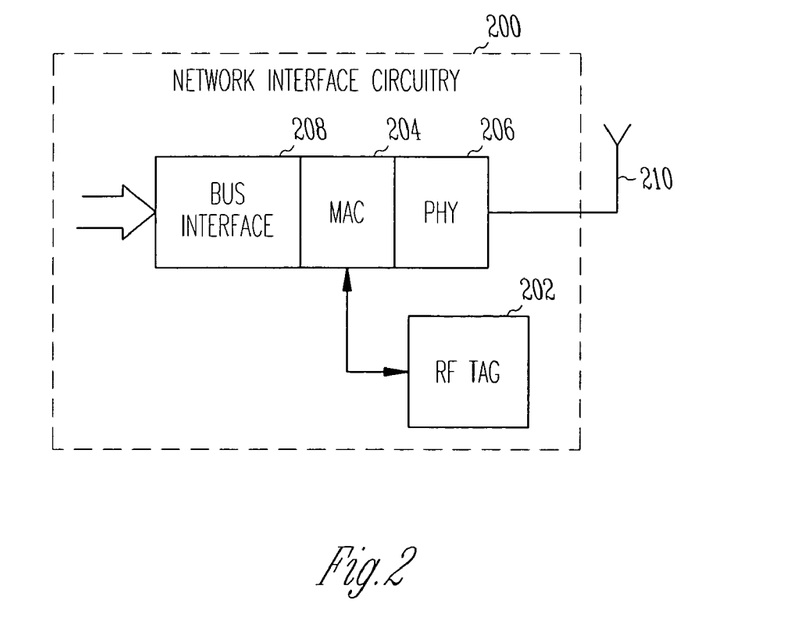
FIG. 2 is a block diagram of network interface circuitry in accordance with some embodiments of the present invention.

FIG. 2 is a block diagram of network interface circuitry in accordance with some embodiments of the present invention. Network interface circuitry 200 may be suitable for use as network interface circuitry 104 (FIG. 1) when network interface circuitry 104 (FIG. 1) includes an RF tag, although other circuitry may also be suitable. In some embodiments, network interface circuitry 104 may be a network interface card (NIC), although the scope of the invention is not limited in this respect. Network interface circuitry 200 may include bus interface 208 to communicate with processor system 106 (FIG. 1) over bus 108 (FIG. 1), media access control (MAC) circuitry 204 to control access over communication link 114 (FIG. 1), and physical layer (PHY) circuitry 206 to provide communication signals for communicating over link 114. In some wireless embodiments, PHY circuitry 206 may include a wireless transceiver coupled with antenna 210.

In accordance with some embodiments of the present invention, network interface circuitry 200 may include RF tag 202. RF tag 202 may have a non-volatile storage element coupled to MAC circuitry 204, allowing MAC circuitry 204 to read information, such as provisioning parameters or a MAC address, in the tag's non-volatile storage element.

Figure 3:
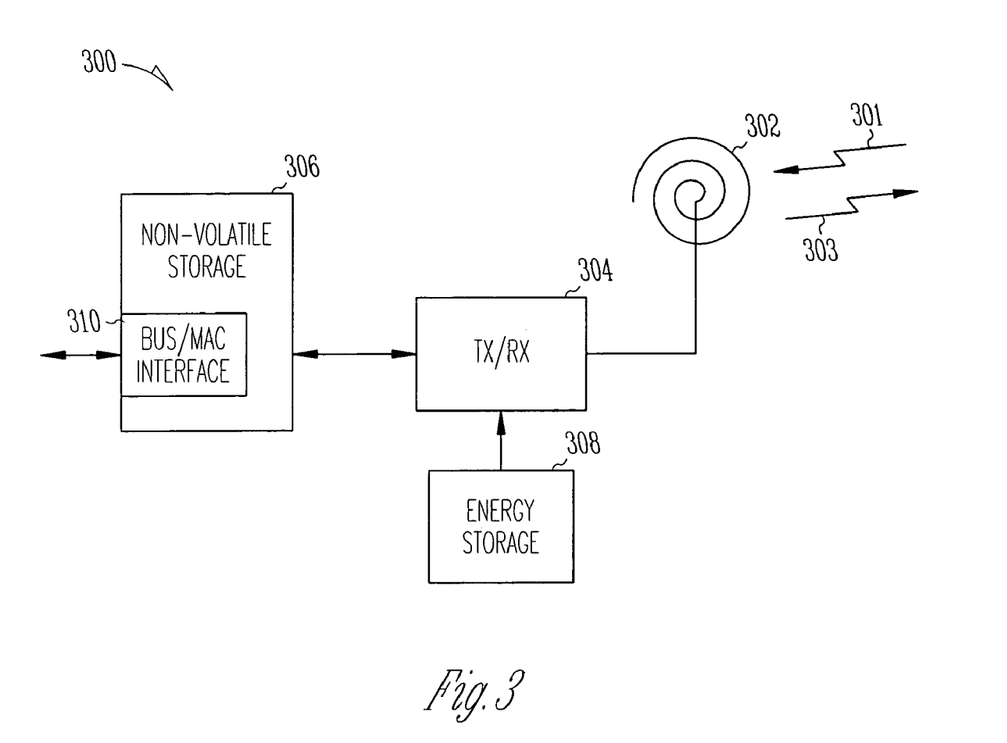
FIG. 3 is a block diagram of a radio-frequency tag in accordance with some embodiments of the present invention.

FIG. 3 is a block diagram of a radio-frequency tag in accordance with some embodiments of the present invention. RF tag 300 may be suitable for use as RF tag 102 (FIG. 1) or RF tag 202 (FIG. 2), although other RF tags may also be suitable. RF tag 300 may include antenna 302 to receive interrogation signals 301 and transmit response signals 303. RF tag 300 may also include transceiver circuitry 304 for receiving interrogation signals 301 from antenna 302, and for transmitting response signals 303. Antenna 302 may be a coil antenna, although other antennas may also be suitable.

RF tag 300 may also include non-volatile storage element 306 coupled with transceiver 304 for storing platform information. The platform information may be written to and stored in non-volatile storage element 306 by a manufacturer, distributor and/or supplier of platform 100 (FIG. 1). Non-volatile storage element 306 may also store provisioning parameters and/or asset tracking information. The provisioning parameters and/or asset tracking information may be written to non-volatile storage element 306 after platform 100 (FIG. 1) is received from the manufacturer, distributor and/or supplier, although the scope of the invention is not limited in this respect.

Non-volatile storage element 306 may be almost any type of non-volatile memory structure, such as an electronically-erasable programmable read-only memory (EEPROM), flash memory or battery-backup random access memory (RAM). In some embodiments, non-volatile storage element 306 may include bus interface 310 for interfacing with a bus or other communication link. In some embodiments, when RF tag 300 is coupled with MAC circuitry 206 (FIG. 2), bus interface 310 may provide an interface to MAC circuitry 206 (FIG. 2). In some embodiments, when non-volatile storage element 306 is coupled directly to processor system 106 (FIG. 1), bus interface 310 may be a three-wire bus, an LPC bus, a USB bus, an IPC bus or an SM bus, although the scope of the invention is not limited in this respect.

RF tag 300 may generate response signal 303 in response to interrogation signal 301 transmitted by an RF tag interrogator and/or RF tag programmer, such as interrogator 400 (FIG. 4) discussed below. Response signal 303 may include the information stored in non-volatile storage element 306, such as the MAC address and/or other platform information or keys. In some embodiments, the RF tag interrogator and/or RF tag programmer may transmit information, such as provisioning parameters and/or an asset tracking number, to RF tag 300 for storage in non-volatile storage element 306 in response to a validated response signal.

In some embodiments, RF tag 300 may be a passive RF tag. In these embodiments, a passive RF tag may use current induced on antenna 302 by interrogation signal 301 to generate the response signal 303. In some embodiments, when RF tag 300 is a passive tag, no battery is generally included as part of the tag. In these embodiments, interrogation signal 301 may induce a current on antenna 302 to power transceiver circuitry 304, allowing transceiver circuitry 304 to transmit response signal 303. In some embodiments, passive RF tags may include a capacitive storage element (e.g., energy storage element 308), which may temporarily store some energy generated from interrogation signal 301.

In some embodiments, RF tag 300 may be an active RF tag. In these embodiments, the active RF tag may use an internal power source to generate response signal 303 in response to interrogation signal 301. In some embodiments, when RF tag 300 is an active tag, a battery or other energy storage element may be included as part of the tag (e.g., energy storage element 308). In these embodiments, energy storage element 308 may power transceiver circuitry 304 to allow transceiver circuitry 304 to transmit response signal 303.

Communication platform 100 (FIG. 1) may use either an active or a passive tag. In some embodiments, RF tag 300 comprises a low-frequency tag operating at frequencies ranging between 100 and 150 kHz. In some embodiments, a low-frequency tag may operate at approximately 125 kHz, although the scope of the invention is not limited in this respect.

In some embodiments, RF tag 300 comprises a high-frequency tag operating at frequencies ranging between approximately 10 and 15 MHz. In some embodiments, a high-frequency tag may operate at 13.56 MHz, although the scope of the invention is not limited in this respect.

In some embodiments, RF tag 300 comprises an ultra-high-frequency tag operating at frequencies ranging between approximately 800 and 1000 MHz. In some embodiments, the ultra-high-frequency tag may operate at frequencies ranging from approximately 866 to 930 MHz, although the scope of the invention is not limited in this respect.

In some embodiments, RF tag 300 may comprise a microwave frequency tag operating at microwave frequencies ranging between approximately 5 and 6 GHz. In some embodiments, the microwave frequency tag may operate at frequencies of approximately 5.8 GHz, although the scope of the invention is not limited in this respect.

Figure 4:
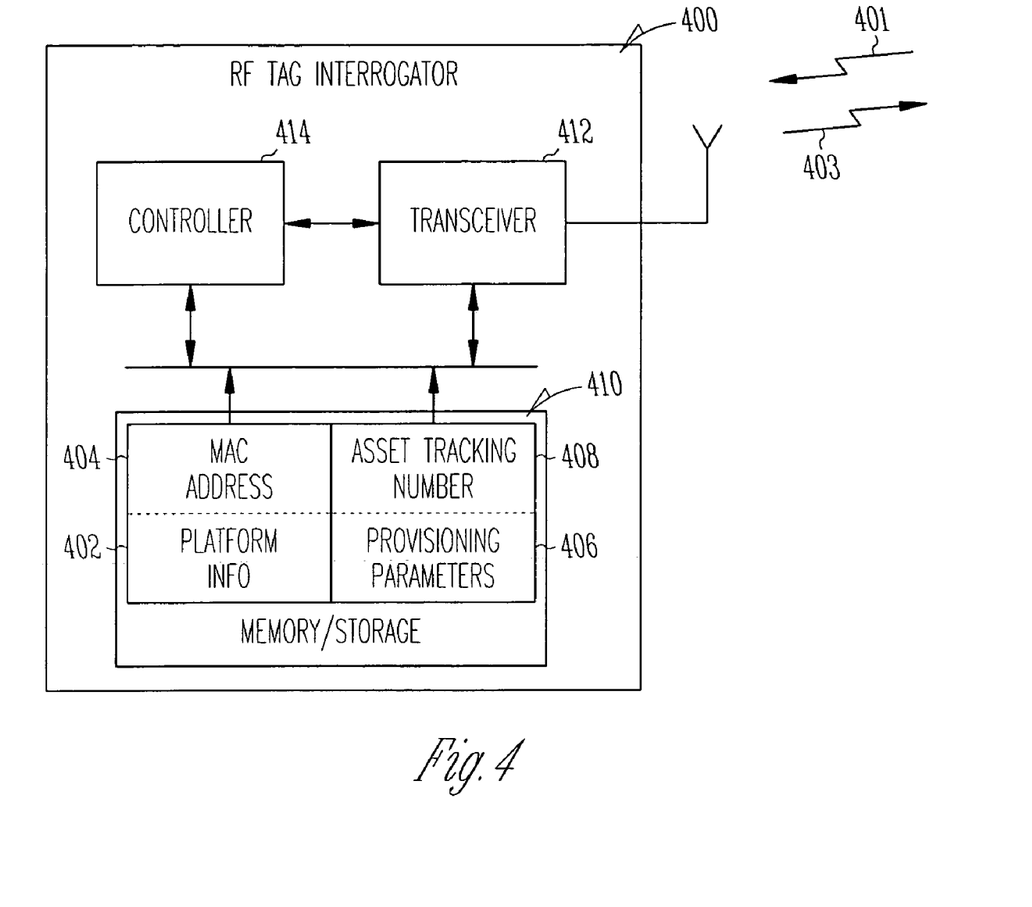
FIG. 4 is a block diagram of a radio-frequency tag interrogator in accordance with some embodiments of the present invention.

FIG. 4 is a block diagram of a radio-frequency tag interrogator in accordance with some embodiments of the present invention. RF tag interrogator 400 may be used to interrogate RF tags, such as RF tag 102 (FIG. 1) to determine information, such as a MAC address and/or platform information, stored in the RF tag. RF tag interrogator 400 may also be used to write information, such as provisioning parameters and/or asset tracking numbers to RF tags, such as RF tag 102 (FIG. 1). RF tag interrogator 400 may include RF tag transceiver 412 for transmitting interrogation signals 401 and receiving response signals 403. Interrogation signals 301 (FIG. 3) may correspond to interrogation signals 401, and response signals 303 (FIG. 3) may correspond to response signals 403.

In some embodiments, RF tag interrogator 400 may also include storage element 410 for storing information received from RF tags, and for storing information to write to RF tags. Storage element 410 may include a memory, a hard drive or other data storage means. For example, in some embodiments, storage element 410 may store a database that may include asset tracking numbers 408 and provisioning parameters 406 to write to platforms, and platform information 402 and MAC addresses 404 received from the interrogation of RF tags of platforms.

In some embodiments, RF tag interrogator 400 may generate the provisioning parameters for a particular communication platform based on the platform information, although the scope of the invention is not limited in this respect. In some embodiments, RF tag interrogator 400 may be used to store the asset tracking number with at least some of the platform information in a remote and/or centralized asset-tracking database.

In some embodiments, RF tag interrogator 400 may be used to track a platform when it is removed from a location or returned to the location by interrogating the RF tag upon either entry and/or exit from the location. In some embodiments, RF tag interrogator 400 may be used to update the asset-tracking database with a current location of the platform based on the tracking, although the scope of the invention is not limited in this respect.

In some embodiments, RF tag interrogator 400 may be a general-purpose computer, computing device, or network communication device with an additional RF tag transceiver (i.e., transceiver 412). In some embodiments, RF tag interrogator 400 may perform verification on information received by interrogating an RF tag of a platform. The verification may include correlating information on a shipping container or shipping paperwork with the platform information received by interrogating the RF tag, although the scope of the invention is not limited in this respect.

In some embodiments, controller 414 may include a processor, which may perform a collision avoidance algorithm at least when response signals are concurrently received from more than one RF tag to separate the information received in the response signals 403, although the scope of the invention is not limited in this respect.

Figure 5:
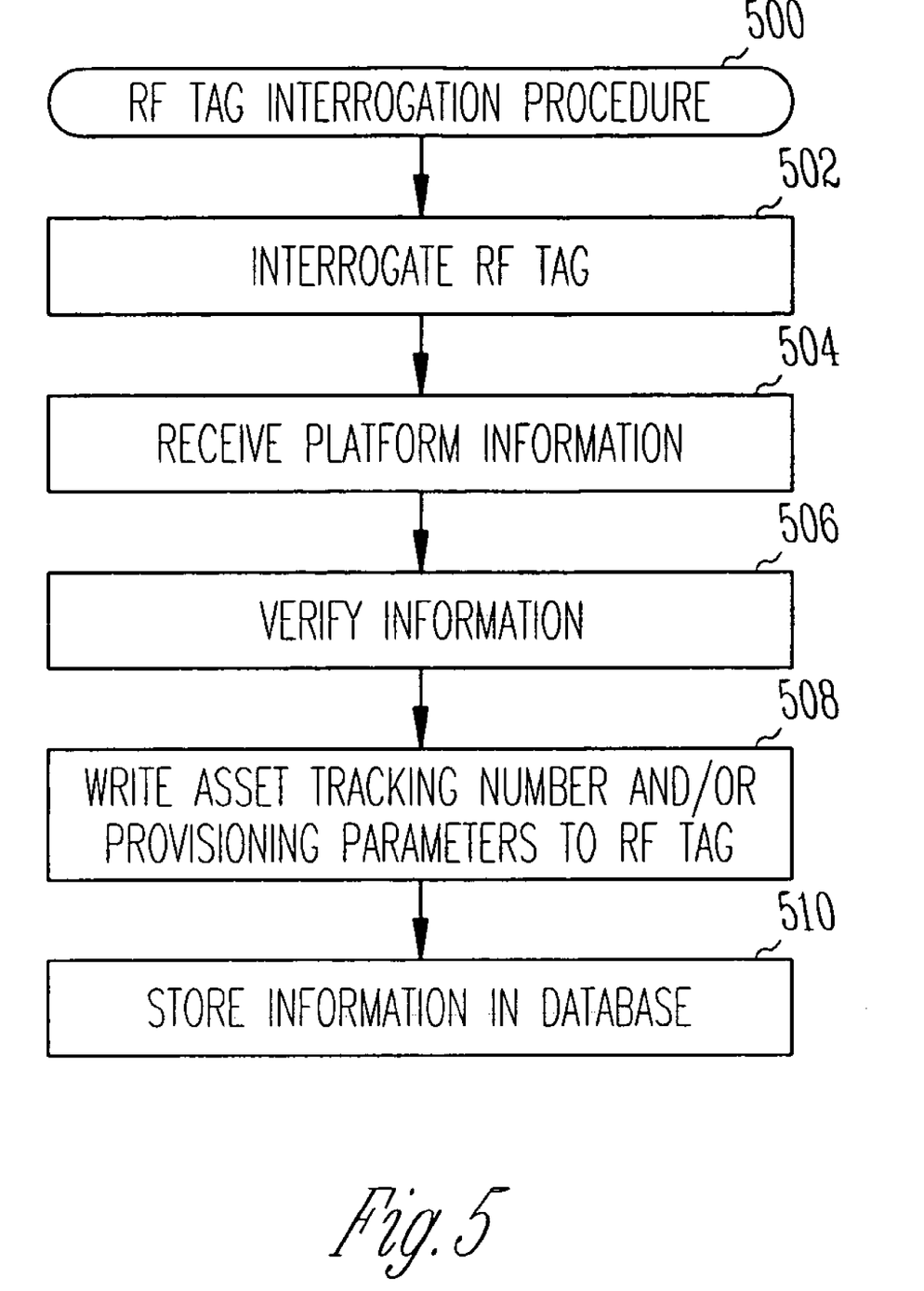
FIG. 5 is a flow chart of a radio-frequency tag interrogation procedure in accordance with some embodiments of the present invention.

FIG. 5 is a flow chart of a radio-frequency tag interrogation procedure in accordance with some embodiments of the present invention. Radio-frequency tag interrogation procedure 500 may be performed by a radio-frequency tag interrogator, such as radio-frequency tag interrogator 400 (FIG. 4), to receive platform information from a tagged platform and to write provisioning parameters and/or asset tracking information to an RF tag of a tagged platform.

In operation 502, an RF tag of a platform may be interrogated by transmitting an interrogation signal. Operation 502 may be performed with a platform as received from a supplier and may be performed while the platform is still in its shipping container.

Operation 504 comprises receiving the platform information in an interrogation signal. In some embodiments, the platform information may include a MAC address.

Operation 506 comprises verifying the received platform information. In some embodiments, operation 506 may comprise checking the received platform with information on shipping documents or information on the shipping container, although the scope of the invention is not limited in this respect.

Operation 508 comprises writing information, such as provisioning parameters and/or an asset tracking number, to the RF tag on the platform. Operation 508 may also be performed while the platform is in its shipping container, although the scope of the invention is not limited in this respect. In some embodiments, operation 508 may comprise generating the provisioning parameters based on the platform information.

Operation 510 comprises storing the platform information in a database. In some embodiments, the asset tracking number may also be stored in the database associated with the platform information for use in subsequent tracking of the platform. In some embodiments, the provisioning parameters and the platform information may be stored in a database for use in performing provisioning over a network.

Figure 6:
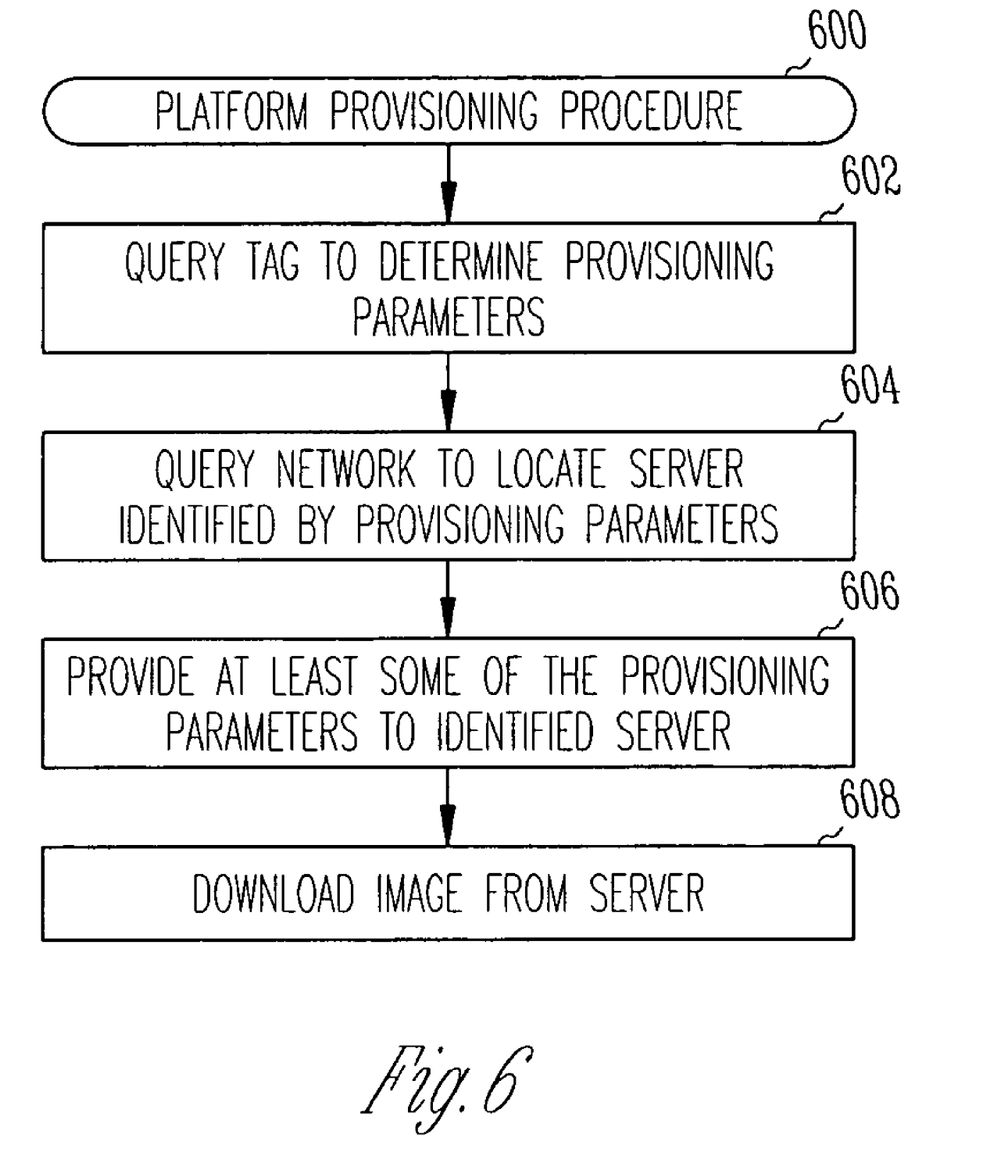
FIG. 6 is a flow chart of a communication platform provisioning procedure in accordance with some embodiments of the present invention.

FIG. 6 is a flow chart of a communication platform provisioning procedure in accordance with some embodiments of the present invention. Communication platform provisioning procedure 600 may be performed by a communication platform, such as communication platform 100 (FIG. 1). Prior to the performance of procedure 600, provisioning parameters may be written to an RF tag of a communication platform. In some embodiments, the RF tag may also have been interrogated to determine platform information. In some embodiments, the provisioning parameters may have been written to the RF tag while the communication platform was still in a shipping box as received from the manufacturer, distributor and/or supplier. In this way, the communication platform does not need to be powered up to be provided provisioning parameters. Procedure 600 may be performed when a communication platform is initially turned on and connected with a network, such as network 112 (FIG. 1), which may be a company's internal network, although the scope of the invention is not limited in this respect.

Operation 602 queries a non-volatile storage element of the RF tag to determine the provisioning parameters. In some embodiments, operation 602 may be performed by processor system 106 (FIG. 1), which may query RF tag 102 (FIG. 1) over internal bus 110. In some other embodiments, operation 602 may be performed by processor system 106 (FIG. 1), which may query RF tag 102 (FIG. 1) through network interface circuitry 104 (FIG. 1) over internal bus 108.

In other embodiments, processor system 106 (FIG. 1) may query RF tag 102 using an RF tag interrogator (not illustrated in FIG. 1) which may send interrogation signals and receive response signals that include the provisioning parameters. In these other embodiments, the RF tag does not need to be coupled with a bus or to network interface circuitry.

Operation 604 comprises querying a network to locate a server identified by the provisioning parameters. Operation 604 may be performed by processor system 106 (FIG. 1) and network interface circuitry 104 (FIG. 1), which may query network 112 (FIG. 1) over link 114 (FIG. 1). If a server cannot be located, the self-provisioning process may not be able to be completed.

Operation 606 comprises providing at least some of the provisioning parameters to the server identified in operation 604. In some embodiments, the MAC address may also be provided to the identified server.

Operation 608 comprises downloading an image from the server in response to providing the provisioning parameters. In some embodiments, the image may be a predetermined platform configuration, although the scope of the invention is not limited in this respect.

Although the individual operations of procedures 500 and 600 are illustrated and described as separate operations, one or more of the individual operations may be performed concurrently, and nothing requires that the operations be performed in the order illustrated.

Referring back to FIG. 1, in some embodiments when communication platform 100 is a wireless communication device, communication platform 100 may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly.

In some embodiments, communication platform 100 may transmit and/or receive RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although communication platform 100 may also be suitable to transmit and/or receive communications in accordance with other techniques including the Digital Video Broadcasting Terrestrial (DVB-T) broadcasting standard, and the High performance radio Local Area Network (HiperLAN) standard. In these embodiments, antenna 210 (FIG. 2) may comprise a directional or omnidirectional antenna, including, for example, a dipole antenna, a monopole antenna, a loop antenna, a microstrip antenna or other type of antenna suitable for reception and/or transmission of RF signals, which may be processed by communication platform 100.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of a wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and like communication systems.

Although communication platform 100 and network interface circuitry 200 (FIG. 2) are illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method comprising:
    interrogating a radio-frequency (RF) tag coupled with a communication platform to determine platform information;
    writing provisioning parameters to the RF tag;
    performing a provisioning process using the provisioning parameters in the RF tag when the platform is coupled with a network; and
    inhibiting subsequent writing to the non-volatile storage element after the writing,
    wherein writing comprises writing the provisioning parameters to a non-volatile storage element of the RF tag.

2. The method of claim 1 wherein the provisioning process comprises:
    querying the RF tag over an internal bus to determine the provisioning parameters;
    querying the network to locate a server identified by the provisioning parameters;
    providing some of the provisioning parameters and some of the platform information to the server; and
    downloading an image from the server for installation on the platform, the image being selected for the platform by the server based on the provided provisioning parameters.

3. The method of claim 1 further comprising generating the provisioning parameters based on at least some of the platform information,
    wherein the platform information comprises at least one of an amount of memory, operating system type, model number, serial number, processor type, input/output system information, a unique identifier, a unique key, and a media-access controller address, and
    wherein the platform information is stored in the RF tag by a supplier of the platform.

4. The method of claim 1 wherein performing the provisioning process comprises providing at least some of the provisioning parameters and at least some of the platform information to a server identified by the provisioning parameters.

5. The method of claim 4 wherein the RF tag is coupled to the platform with a wireline bus, and
wherein the platform reads the provisioning parameters from the RF tag over the bus prior to providing the provisioning parameters to the server during the provisioning process.

6. The method of claim 1 wherein the RF tag comprises a non-volatile storage element coupled to an internal wireline bus of the platform, the wireline bus being coupled to a processor system of the platform.

7. The method of claim 6 wherein the non-volatile storage element stores at least some of the platform information, and
wherein writing comprises writing the provisioning parameters to the non-volatile storage element.

8. The method of claim 1 wherein the platform information comprises a media access controller (MAC) address, and
wherein performing the provisioning process comprises providing the provisioning parameters and the MAC address to a server identified by the provisioning parameters.

9. The method of claim 1 further comprising:
writing an asset tracking number to the RF tag for storage in a non-volatile storage element of the RF tag, and
tracking locations of the platform by interrogating the RF tag to determine the asset tracking number.

10. The method of claim 9 further comprising:
storing the asset tracking number with at least some of the platform information in an asset-tracking database;
tracking the platform when it is removed from a location or returned to the location by interrogating the RF tag upon either entry to or exit from the location; and
updating the asset-tracking database with a current location of the platform based on the tracking.

11. A method comprising:
interrogating a radio-frequency (RF) tag coupled with a communication platform to determine platform information; and
writing provisioning parameters to the RF tag,
wherein the RF tag is part of network interface circuitry, the network interface circuitry being coupled to a processor system of the platform with a wireline bus, and
wherein the RF tag includes a non-volatile storage element coupled to media access controller circuitry of the network interface circuitry.

12. The method of claim 11 wherein the non-volatile storage element stores at least some of the platform information, and
wherein writing comprises writing the provisioning parameters to the non-volatile storage element.

13. A method comprising:
interrogating an radio-frequency (RF) tag coupled with a communication platform to determine platform information; and
writing an asset tracking number to the RF tag, the RF tag to transmit the asset tracking number when subsequently interrogated upon entry to or exit from a location,
wherein writing the asset tracking number further comprises writing the asset tracking number to a non-volatile storage element of the RF tag and inhibiting subsequent writing to the non-volatile storage element.

14. The method of claim 13 further comprising:
storing the asset tracking number with the platform information in an asset-tracking database;
tracking the platform when it is removed from a location or returned to the location by interrogating the RF tag upon either entry or exit; and
updating the asset-tracking data base with a current location of the platform based on the tracking.

15. The method of claim 14 wherein the platform information is stored in the RF tag by a supplier of the platform.

16. The method of claim 15 wherein the platform information comprises at least one of an amount of memory, operating system type, model number, serial number, processor type, input/output system information, a unique identifier, a unique key, and a media-access controller address.

17. The method of claim 16 wherein, when the platform information comprises a MAC address, the method further comprises updating a current location when the platform is coupled to a network.

18. The method of claim 13 wherein writing further comprises writing provisioning parameters to the RF tag, and
wherein the method further comprises performing a provisioning process using the provisioning parameters stored in the RF tag when the platform is coupled with a network.

19. A platform comprising:
a processor system;
a radio-frequency (RF) tag coupled to the processor system, the RF tag to accept provisioning parameters for storage therein to perform a self-provisioning process for the platform; and
network interface circuitry comprising the RF tag and media access control circuitry,
wherein the network interface circuitry is coupled to the processor system with a bus,
wherein the RF tag has a non-volatile storage element to store the provisioning parameters, and
wherein the non-volatile storage element has a media access control interface to couple with the media access control circuitry.

20. The platform of claim 19 wherein the RF tag has the platform information stored therein, the platform information comprising a media access controller address, and
wherein the platform is to perform a self-provisioning process and is to provide the provisioning parameters and the media access control address to a server identified by the provisioning parameters.

21. The platform of claim 20 wherein the RF tag has a non-volatile storage element to store the provisioning parameters, and
wherein the non-volatile memory has a bus interface coupling the processor system over an internal bus,
wherein the processor system is to read the provisioning parameters from the non-volatile storage element over the internal bus when performing the self-provisioning process.

22. A wireless communication device comprising:
a substantially omnidirectional antenna; and
a communication platform coupled with the antenna, the platform comprising a processor system and network interface circuitry that includes a radio-frequency (RF) tag coupled to the processor system, the RF tag to accept provisioning parameters for storage therein to perform a self-provisioning process for the platform, wherein network interface circuitry includes media access control circuitry and is coupled to the processor system with a bus, wherein the RF tag has a non-volatile storage element to store the provisioning parameters, and wherein the non-volatile storage element has a media access control interface to couple with the media access control circuitry.

23. The wireless communication device of claim 22 wherein the RF tag has the platform information stored therein, the platform information comprising a media access controller address, and wherein the platform is to perform a self-provisioning process and is to provide the provisioning parameters and the media access control address to a server identified by the provisioning parameters.

24. The wireless communication device of claim 23 wherein the RF tag has a non-volatile storage element to store the provisioning parameters, and wherein the non-volatile memory has a bus interface coupling the processor system over an internal bus, wherein the processor system is to read the provisioning parameters from the non-volatile storage element over the internal bus when performing the self-provisioning process.

25. The wireless communication device of claim 22 wherein the wireless communication device is a wireless local area network communication device, and wherein the platform comprises a multicarrier transceiver to communicate multicarrier communication signals over a multicarrier communication link with a wireless local area network, the multicarrier communication signals being orthogonal frequency division multiplexed.

* * * * *

UNITED STATES PATENT AND TRADEMARK OFFICE
CERTIFICATE OF CORRECTION

PATENT NO. : 7,111,778 B2  Page 1 of 1
APPLICATION NO. : 10/880978
DATED : September 26, 2006
INVENTOR(S) : Bright et al.

It is certified that error appears in the above-identified patent and that said Letters Patent is hereby corrected as shown below:

On the Title page, item (56), under "U.S. Patent Documents", in column 2, line 3, after "6,982,672" delete "B1" and insert -- B2 --, therefor.

Column 11, line 29, in Claim 9, after "tag" delete "," and insert -- ; --, therefor.

Column 11, line 59, in Claim 13, delete "an" and insert -- a --, therefor.

Column 12, line 9, in Claim 14, delete "data base" and insert -- database --, therefor.

Signed and Sealed this

Second Day of January, 2007

JON W. DUDAS
*Director of the United States Patent and Trademark Office*